US009736395B2

(12) United States Patent
Ramon (10) Patent No.: US 9,736,395 B2
(45) Date of Patent: Aug. 15, 2017

(54) DYNAMIC DISPLAY LAYOUT (71) Applicant: BARCO N.V., Kortrijk (BE)

(72) Inventor: Peter Ramon, Kachtem (BE)

(73) Assignee: BARCO N.V., Kortrijk (BE)

( * ) Notice: Subject to any disclaimer, the term of this patent is extended or adjusted under 35 U.S.C. 154(b) by 0 days.

(21) Appl. No.: 15/112,367

(22) PCT Filed: Jan. 21, 2015

(86) PCT No.: PCT/EP2015/051172
§ 371 (c)(1),
(2) Date: Jul. 18, 2016

(87) PCT Pub. No.: WO2015/110487
PCT Pub. Date: Jul. 30, 2015

(65) Prior Publication Data
US 2016/0337602 A1  Nov. 17, 2016

(30) Foreign Application Priority Data

Jan. 24, 2014  (GB) .................................. 1401234.8

(51) Int. Cl.
H04N 5/775  (2006.01)
H04N 5/765  (2006.01)
(Continued)

(52) U.S. Cl.
CPC ......... *H04N 5/2624* (2013.01); *G06F 3/1446* (2013.01); *H04N 5/265* (2013.01);
(Continued)

(58) Field of Classification Search
CPC ..... H04N 5/2624; H04N 5/2628; H04N 5/265
(Continued)

(56) References Cited

U.S. PATENT DOCUMENTS 6,161,114 A  12/2000 King
7,554,571 B1  6/2009 Beck et al.
(Continued)

FOREIGN PATENT DOCUMENTS

CN  103503430 A  1/2014
EP  0929184 A2  7/1999
(Continued)

OTHER PUBLICATIONS

International Search Report (ISR) dated Apr. 20, 2015, for PCT/EP2015/051172.
(Continued)

*Primary Examiner* — Robert Chevalier
(74) *Attorney, Agent, or Firm* — Bacon & Thomas, PLLC (57) ABSTRACT A method for obtaining a dynamic display layout on a display area having at least one sub-area defined thereon. The method having the steps of receiving video image data from a video data source; evaluating a rule associated with each sub-area as applied to a property of the received video image data or the video data source; if the evaluating results in acceptance of the video image data by one of the sub-areas, assigning the video image data to the one sub-area; otherwise, allocating an additional sub-area on the display area, and assigning the video image data to the additional sub-area. Additionally, each sub-area is allocated according to properties of the video image data assigned to it or of the video data source from which the respective video image data is received. A corresponding video processing system, a corresponding controller, and corresponding software are also disclosed.

14 Claims, 6 Drawing Sheets (51) Int. Cl.
    *H04N 5/262*    (2006.01)
    *G06F 3/14*     (2006.01)
    *H04N 5/265*    (2006.01)
    *H04N 21/431*   (2011.01)

(52) U.S. Cl.
    CPC ..... *H04N 5/2628* (2013.01); *G09G 2300/026* (2013.01); *H04N 21/4314* (2013.01); *H04N 21/4316* (2013.01)

(58) Field of Classification Search
    USPC .............................. 386/230, 200, 248, 282
    See application file for complete search history.

(56) References Cited

U.S. PATENT DOCUMENTS

| | | |
|---|---|---|
| 2003/0001878 A1 | 1/2003 | Matsumoto |
| 2005/0264648 A1 | 12/2005 | Ivashin et al. |
| 2006/0112330 A1 | 5/2006 | Iwasaki |
| 2006/0150215 A1 | 7/2006 | Wroblewski |
| 2006/0200759 A1 | 9/2006 | Agrawala |
| 2007/0200923 A1 | 8/2007 | Eleftheriadis et al. |
| 2007/0294238 A1 | 12/2007 | Citron et al. |
| 2012/0042240 A1* | 2/2012 | Oliveira ................ G06F 17/212 715/243 |
| 2013/0055055 A1 | 2/2013 | Turcotte et al. |
| 2013/0198795 A1 | 8/2013 | Eleftheriadis et al. |
| 2014/0036155 A1 | 2/2014 | Guo et al. |

FOREIGN PATENT DOCUMENTS

| | | |
|---|---|---|
| EP | 2530603 A1 | 12/2012 |
| WO | 2012/139343 A1 | 10/2012 |
| WO | 2012/153290 A1 | 11/2012 |
| WO | 2013/009996 A1 | 1/2013 |

OTHER PUBLICATIONS

Written Opinion dated Apr. 20, 2015, for PCT/EP2015/051172.
Second Written Opinion dated Jan. 13, 2016, for PCT/EP2015/051172.
International PreliminaryReport on Patentability (IPRP) dated May 19, 2016, for PCT/EP2015/051172.
British Search Report dated Aug. 15, 2014, for GB 1401234.8.

* cited by examiner

DYNAMIC DISPLAY LAYOUT

The present invention relates generally to display systems and particularly to methods and systems for arranging a layout of video image data displayed on a display system.

BACKGROUND

High resolution displays or display walls are mostly used to show compositions of video image data from different video data sources, shown simultaneously on screen. The video image data can contain e.g. videos, synthetic images, photos, text etc.

The user could arrange the video image data from the various video data sources manually on the display screen; this provides full freedom, but is often seen as cumbersome and not user friendly. A "pre-defined layout" consists of pre-allocated places that the user can fill with video image data appropriate for these places. This solution supports the layout arrangement, but also reduces the freedom. In a fully automatic layout system, an optimal arrangement is often calculated according to a certain condition. Such a condition could e.g. be minimizing the space between video image data sources, the so-called "white space".

EP0929184 discloses a method for minimizing the white space between a fixed collection of digital images in a pre-designed area.

US20120042240 discloses a way of arranging a collection of items in a specific order. An item can be added to the collection and the available display area is then recursively bisected into sub-regions, thus the width of the sub-regions depends on the amount of preceding bisections.

SUMMARY OF THE INVENTION

It is an object of the present invention to provide an alternative display system and particularly to provide a method and system for arranging a layout of video image data displayed on a display system.

It is an advantage of the present invention to be able provide a display layout method where the user can add several instances of video image data of arbitrary content and shape from different video data sources, and where an adequate layout is obtained automatically.

According to an aspect of the present invention, there is provided a method for obtaining a dynamic display layout on a display area having at least one sub-area defined thereon, the method comprising: receiving video image data from a video data source; evaluating a rule associated with each respective one of said at least one sub-area as applied to a property of said received video image data or said video data source; if said evaluating results in acceptance of said video image data by one of said at least one sub-area, assigning said video image data to said one sub-area; otherwise, allocating an additional sub-area on said display area, and assigning said video image data to said additional sub-area; wherein each sub-area is allocated according to properties of the video image data assigned to it or of the video data source from which said respective video image data is received.

The rule, or set of rules, associated with each sub-area (i.e., each bounding box for video image data originating from a certain video data source), determines whether video image data from a given video data source can be hosted by said sub-area. If no available sub-area is adequate, a new sub-area is allocated for this source. The video data source is a device, storage, server, or similar that provides video image data. The video data source may additionally provide audio data, associated with the video image data.

Embodiments of the present invention may just apply rules to one or more properties of the received video image data. Embodiments of the present invention may just apply rules to one or more properties of the video data source from which the video image data to be allocated is received. Embodiments of the present invention may also apply rules to a combination of properties of the received video image data and of the video data source from which said video image data is received.

In an embodiment of the method according to the present invention, the size of each respective sub-area is proportional to the number of native pixels of the video image data assigned to it.

It is an advantage of this embodiment that size ratios between video streams from different sources are respected.

In an embodiment of the method according to the present invention, the size of each respective sub-area is proportional to the number of symbols of the video image data assigned to it. In a particular embodiment, the symbol size of the sub-areas is adapted in such a way that the size of displayed symbols in respective allocated sub-areas will be substantially equal.

It is an advantage of this embodiment that symbols can be shown in a similar way across different sub-areas of the display area, regardless of the video data source from which they originate.

In an embodiment of the method according to the present invention, the display area is divided into sub-areas along lines with arbitrary orientations. In a particular embodiment, the display area is divided into sub-areas along horizontal lines and/or vertical lines.

It is an advantage of these embodiments that a display area can efficiently be divided into sub-areas by any number of arbitrary polygons, and in particular rectangles.

In an embodiment of the method according to the present invention, an energy function is evaluated for a plurality of display layouts, and an optimal layout is selected on the basis of said energy function.

It is an advantage of this embodiment that different layouts, i.e. sub-area allocations, can be compared in an objective way, and the selection of a satisfactory layout, e.g. an optimal layout can be performed automatically.

In a particular embodiment, a display layout that minimises the energy function is selected.

In a more particular embodiment, the energy function is based on the amount of white space.

In an embodiment of the method according to the present invention, video image data from a plurality of video data sources are allocated to a sub-area. In a particular embodiment, video image data from a first one of said plurality of video data sources is displayed in full or partial overlay relative to video image data from a second one of said plurality of video data sources.

It is an advantage of this embodiment that video streams can be arbitrarily combined within a given sub-area, which can lead to more optimal use of the total display area.

In an embodiment of the method according to the present invention, the rule associated with a given sub-subarea governs a position and/or a size of video image data within said given sub-area, relative to said given sub-area and/or relative to a position of other video image data allocated to said given sub-area.

It is an advantage of this embodiment that size and position based rules are easy to define, and efficiently lead to a good, e.g. optimal usage of the display area on the basis of geometrical criteria.

In an embodiment of the method according to the present invention, the video image data is scaled in a way that preserves aspect ratio.

It is an advantage of this embodiment that the images are displayed in a natural-looking way.

In an embodiment of the method according to the present invention, video image data is scaled and positioned in such a way that no overlap is created between video image data from different video data sources.

It is an advantage of this embodiment that the full capacity of the display area may be used to simultaneously show as many different video feeds as possible.

In an embodiment of the method according to the present invention, video image data from each video data source comprises one or more of a text, an image, a sequence of images, and a video stream.

In an embodiment of the method according to the present invention, the position and/or size of video image data from a given video data source in a selected layout is used to provide directional characteristics of an audio signal corresponding to said given video data source.

It is an advantage of this embodiment that the audio associated with simultaneously displayed video feeds may be reproduced in such a way that it is psycho-acoustically perceived in a way that is consistent with the spatial distribution of the displayed images.

According to an aspect of the present invention, there is provided a video processing system for generating a dynamic display layout, at least one input interface arranged to receive video image data from a respective video data source, a frame buffer memory, an output interface arranged to send a video stream from said frame buffer memory to a display having a display area, a rule memory for storing rules associated with respective sub-areas defined on said display area, and rule evaluation logic configured to evaluate said rules as applied to a property of said received video image data or said video data source; wherein the video processing system is adapted to add received video image data from one video data source to the frame buffer memory; wherein the video processing system is configured to position the received video image data according to a result of an evaluation by said rule evaluation logic, in such a way that: if the respective rule associated with one of the at least one sub-area accepts the received video image data, the received video image data is assigned to said one sub-area; otherwise, an additional sub-area is allocated on the display area, and the received video image data is assigned to said additional sub-area; and wherein the video processing system is configured to allocate each sub-area according to properties of the respective video image data assigned to it.

According to an aspect of the present invention, there is provided a controller for use in a video processing system for generating a dynamic display layout, and especially for use with a display having a display area, the controller comprising at least one input interface arranged to receive video image data from a respective video data source, a frame buffer memory, an output interface arranged to send a video stream from said frame buffer memory to the display having a display area, a rule memory for storing rules associated with respective sub-areas defined on said display area, and rule evaluation logic configured to evaluate said rules as applied to a property of said received video image data or said video data source;

wherein the controller is adapted to add received video image data from one video data source to the frame buffer memory;

wherein the controller is configured to position the received video image data according to a result of an evaluation by said rule evaluation logic, in such a way that:
  if the respective rule associated with one of the at least one sub-area accepts the received video image data, the received video image data is assigned to said one sub-area;
  otherwise, an additional sub-area is allocated on the display area, and the received video image data is assigned to said additional sub-area;
  and wherein the controller is configured to allocate each sub-area according to properties of the respective video image data assigned to it or of the video data source from which said respective video image data is received.

The video stream sent in embodiments of the invention may be a traditional video signal. The video stream sent in embodiments of the present invention may also be a network stream, which provides video data formatted according to a certain protocol (e.g., RTP) to a remote display over a network.

The controller can be a stand-alone device implemented for example as a microcontroller and adapted for use with the display.

The technical effects and advantages of the system, software, and controller according to the present invention correspond mutatis mutandis to those of the corresponding method according to the present invention.

BRIEF DESCRIPTION OF DRAWINGS

These and other technical effects and advantages of the present invention will now be described in more detail with reference to the accompanying drawings, in which.

DESCRIPTION

In the following embodiments of the present invention are described. These are intended to provide examples of the invention but the skilled person will appreciate that the invention is also as disclosed in the appended claims.

Throughout the description, unless specified otherwise, the term "image" is used broadly, and may include visual information such as text, icons, symbols, and pictures, whether static or dynamic.

Figure 1:
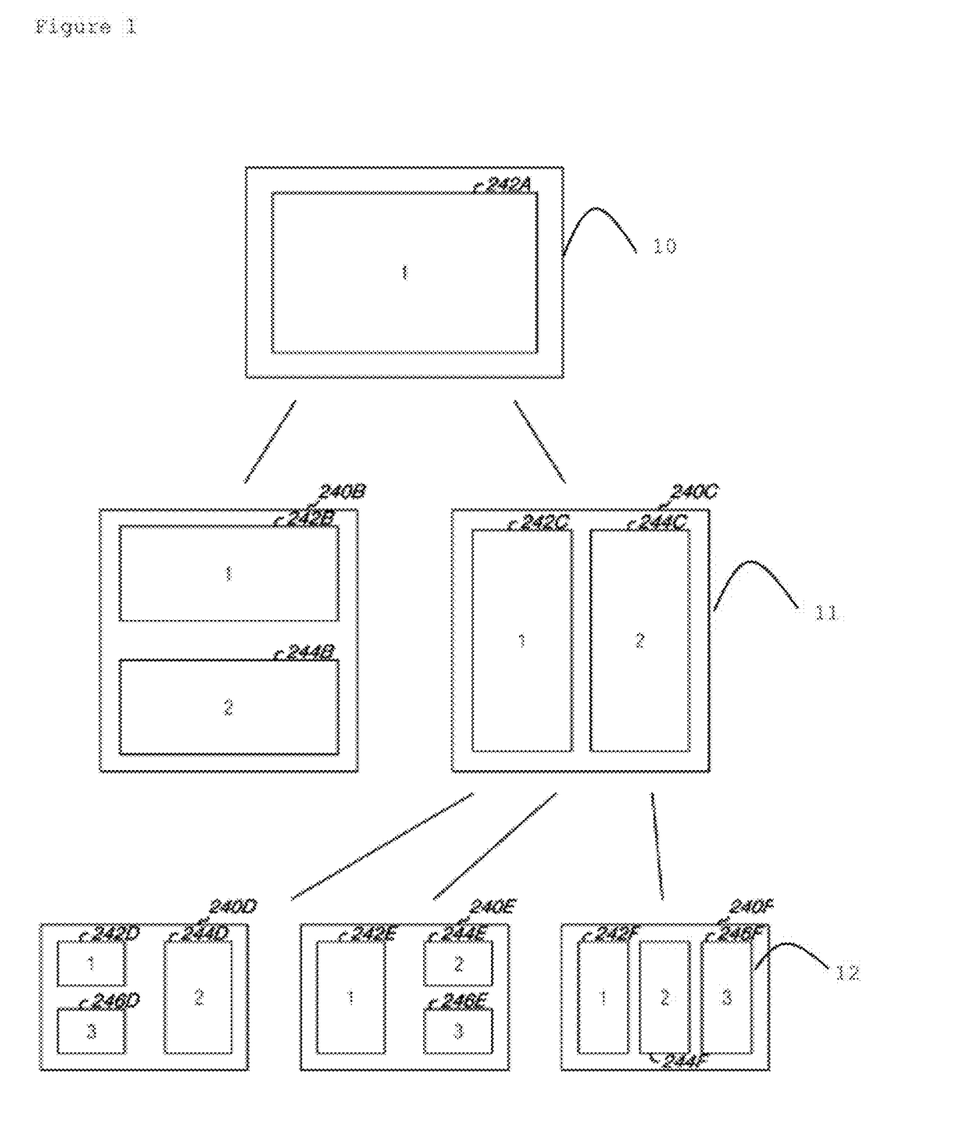
FIG. 1 is an illustration of creating sub-areas by consecutively bisecting the initial area.

FIG. 1 shows an illustration of prior-art where sub-areas for new content are created by recursive bisection. The initial area in 10 can be divided by horizontal- or vertical bisection, as shown in 11. The vertically bisected area is then further divided in three ways, as shown in 12. FIG. 1 also shows that there is an order preserved among the tiles, indicated by the "1", "2", "3" inside the sub-areas. The ordering is implemented from left to right or from up to down or in a clockwise rotation, as can be seen in 12.

Figure 2:
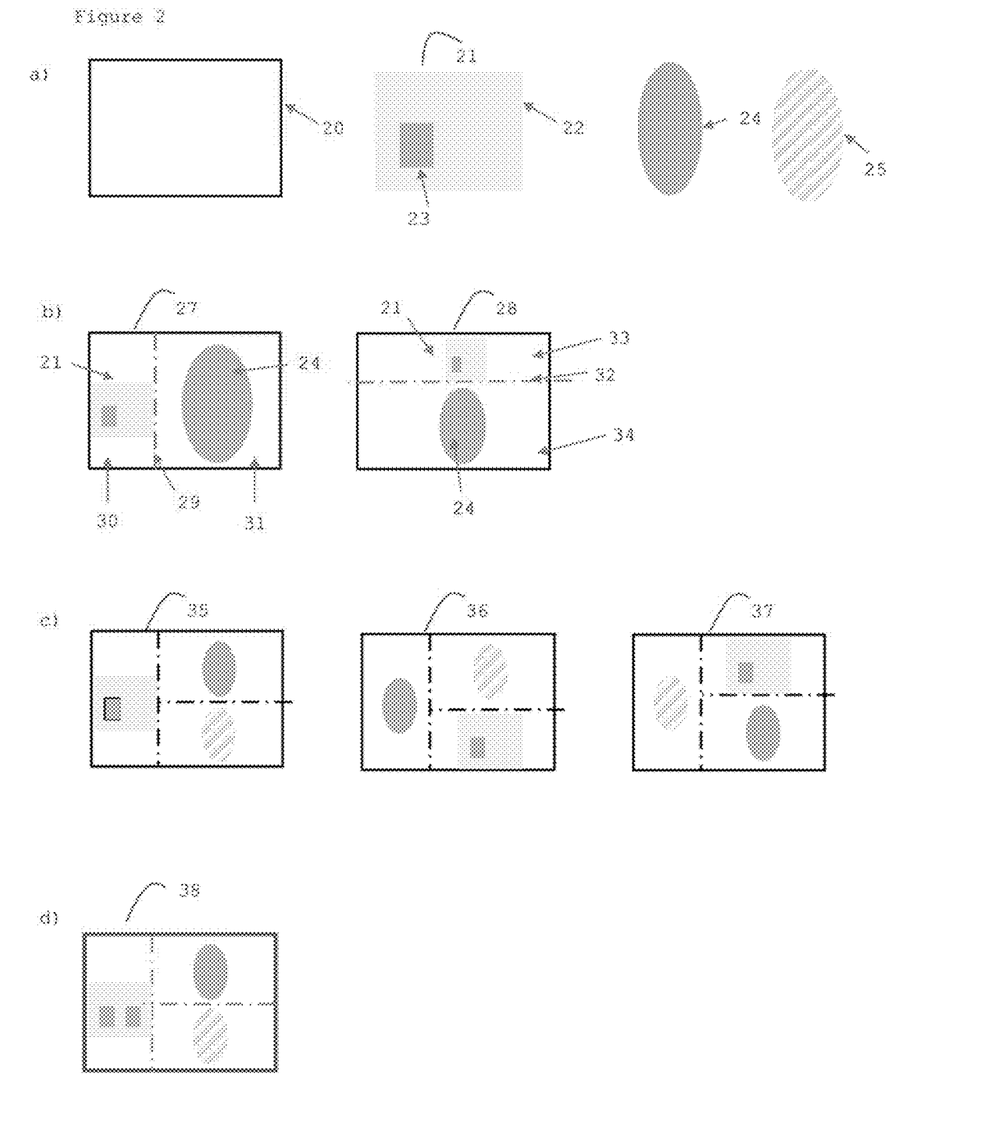
FIG. 2 is an illustration of an embodiment of the present invention showing schematics of different layouts.

FIG. 2a) illustrates an embodiment of the present invention. An area called the "canvas" is designated by reference number 20. All content to be displayed will reside within this area. The canvas 20 can include all pixels of a display device (not shown) but a reduced amount of pixels is also possible. 21 is an example of a "pre-defined layout" which comprises rules describing the bounding boxes for the video data originating from the respective video data sources 22 and 23. 23 is overlaid onto 22. 24 and 25 are associated with video data sources that are different from 22 and 23. The pre-defined layout 21 is displayed on a canvas when video image data from a video data source 24 is sent to the same canvas. The canvas can then be split between the video data sources according to an appropriate rule. This could for example be the number of pixels of the un-scaled, so-called "native" video image data. In a general case any type of rule can be applied. 27 in FIG. 2b) shows the result of such a division. The canvas 27 is split into sub-area 30 and 31 by the line 29.

It is a goal of embodiments of the present invention to find a layout that selected according to a certain condition, e.g. is optimal according to a certain condition. In the present exemplary embodiment this condition is to minimize the "white space", that is the area on the canvas that is not occupied by displayed video image data. For an application where a video data source provides video image data containing text, the condition could for example be to make sure that all text or symbols has the same font size. Or it could be any other condition of choice. In general terms this can be seen as an energy function that can be minimized to find the best solution. In this optimization process, more than one arrangement of the sub-areas is evaluated and the best resulting layout is chosen.

In an embodiment of the present invention this is illustrated by testing a layout when the canvas is divided horizontally by line 29 or vertically by line 32. In a general case it is of course possible to divide the canvas in an arbitrary number of orientations and an arbitrary number of sub-areas. It is even possible to consider an arbitrary number of dimensions, in case the method is applied to a multi-dimensional application (for the spatial case it could for example be a three-dimensional hologram).

The size of the sub-area 30 or 33 in FIG. 2b) corresponds to some property of the video image data from the video data sources 22 and 23 and the subarea 31 or 34 corresponds to some property of the video image data from video data source 24. Such a property could for example be the number of native pixels of these video data sources, i.e. the number of pixels of the video data source in the initial state, before scaling. Alternatively different types of video data sources could be given different weights so that more important video data sources always are given a larger sub-area. But these examples should not be seen as a limitation. In the present example it is the rule of minimizing white space that is evaluated. Thus, FIG. 2b) shows that it is the horizontal division that provides the least white space since the video image data from both video data sources can be displayed larger when using the horizontal division. For the rules and conditions chosen in this specific case, switching place of sub-areas 30 and 31 (or 33 and 34) and their corresponding content, would not influence the evaluation outcome. A rule can be added in order to differentiate between the mirrored solutions.

Figure 3:
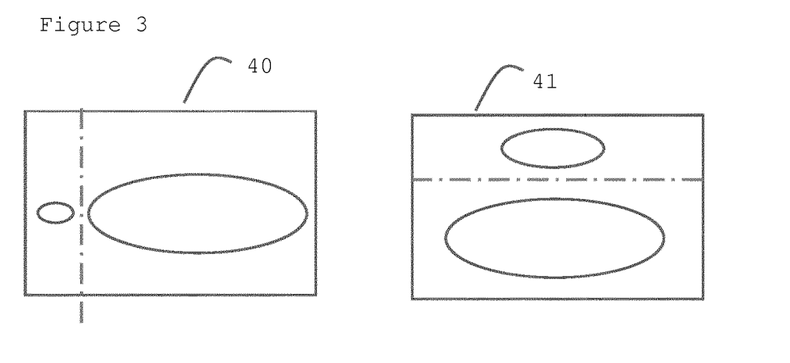
FIG. 3 is an illustration of an embodiment of the present invention showing video image data from different video data sources in different sub-areas.

Since the size of a sub-area depends of the video image data content, there will be an ad-hoc ordering and layout of the sub-areas allocated to the video image data sources, depending on which video image data source is chosen next. With changing content property there will come a point when the aspect ratio of the bounding box equals the aspect ratio of the video image data displayed inside the bounding box, and the layout can "flip". FIG. 3 shows a canvas 40 with a smaller video image data source in the left sub-area and a larger video image data source in the right sub-area. In this example it is the purpose of minimizing the white space. If a consecutively larger video image data source would be chosen for the left video image data source, at a certain size of the video image data source it would be more beneficial to divide the space vertically, for the overall layout, as in 41. The large video image data source has the same size in 40 and 41 while the small video image data source is larger in 41 and thus the white space is less for 41.

US20120042240 discloses a layout method where a new item added will always enter a certain position so that the ordering is preserved. Thus, US20120042240 do not teach how to make the whole layout automatically adapt, and perhaps even re-order, depending on properties of the video image data content.

Pre-defined layouts, such as e.g. 21, consist of a collection of rules that define whether and how video image data from a video data source is introduced in corresponding sub-area. For example:

- A video image data from a video data source with a certain reference identity or property as referred to by one of the rules will enter the corresponding sub-area. The identity could be e.g. a name or any means for identification. The property could be e,g, type, native resolution, dimension (e.g. 3D or mono), content type (e.g. text vs. image). But these examples should not be seen as limitations.
- If video image data from a video data source does not comply with conditions for entering an existing sub-area, a new sub-area will be created for that video image data.
- Several sub-areas are positioned with relative distances to each other and to the canvas borders in a non-overlapping way.
- The native aspect ratio of each instance of video image data is maintained during scaling and the scaling is done as such that no new overlaps between video image data instances are created.

FIG. 2c) illustrates an embodiment of the present invention where a video image data from a video data source 25 is added to canvas 27 to create canvas 35. If division of the canvas is again horizontal and vertical, there will be a significant increase in the number of options to evaluate since there can be a mix of horizontal and vertical division within the same layout. Canvases 35, 36 and 37 illustrate examples of different permutations of the video image data sources to be evaluated. If each case is considered unique there will be 18 solutions to evaluate for this specific case.

In FIG. 2d) video image data from another video data source 23 is added to the layout illustrated by canvas 35. The video image data matches the conditions for entering the left sub-area and is added according to the rules.

Figure 4:
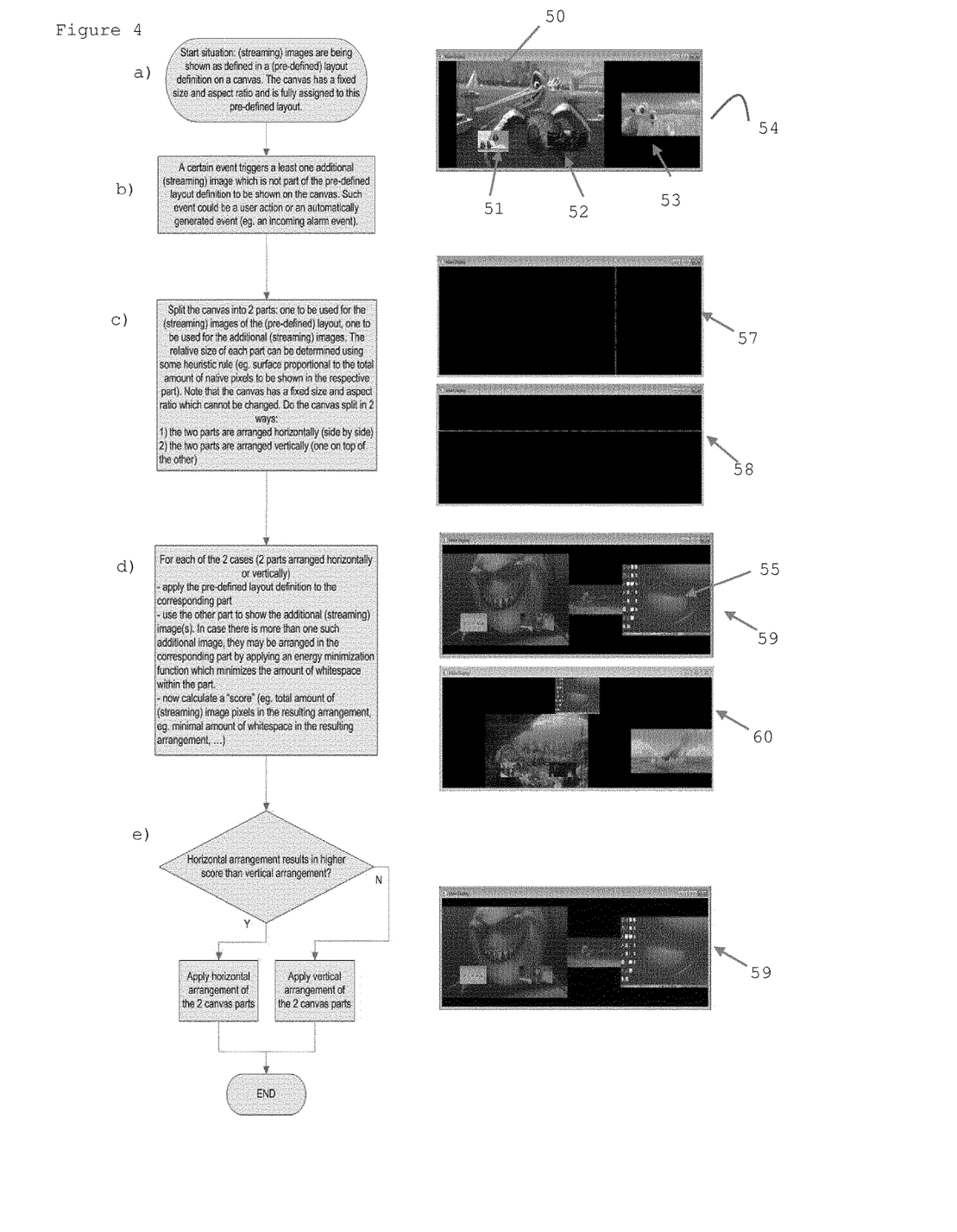
FIG. 4 is an illustration of an embodiment of the present invention showing an example of a real implementation.

FIG. 4 shows an example of an embodiment of the present invention.

The initial situation a) describes how images are streamed to the canvas 54 which contains a predefined layout with the video image data from video data sources 50, 51, 52, and 53.

In step b) an additional video image data source 55 is launched. The associated video image data does not fit the criteria to enter the predefined layout in canvas 54, so a new sub-area must be created for the additional video image data. The launching of this type of video image data source could for example be initiated by a user or it could be automatically generated, for example by an incoming alert.

In the present embodiment it is the purpose to minimize the white space. The canvas is therefore in step c) divided in two parts, horizontally 57 or vertically 58. The area of each part can be related to properties of the video image data sources, such as for example the total number of native (before scaling) pixels of the video data sources whose video image data is displayed in the corresponding sub-area.

In step d) the pre-defined layout is put in its dedicated sub-area and filled with the streamed video image data that match the rules of the pre-defined layout. The video image data from the additional video data source is put in the other sub-area. In step e) the amount of white space is calculated. This can for example be done with an energy minimisation function. It turns out that, for this specific case, it is the horizontal division of the canvas that provides the least white space.

Figure 5:
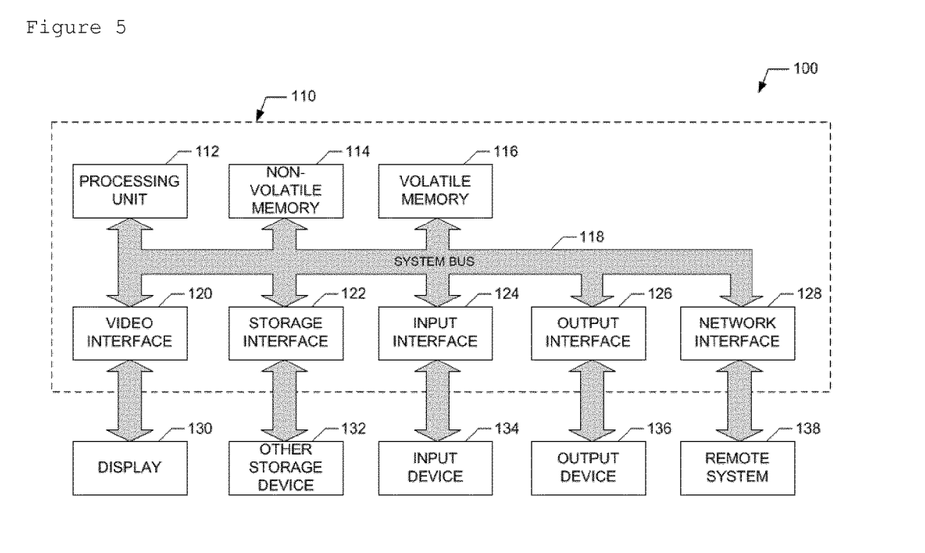
FIG. 5 illustrates a block diagram representative of an exemplary computing environment in which exemplary embodiments of the present invention may be implemented.

FIG. 5 illustrates a block diagram representation of an exemplary computer environment 100 in which the present invention may be implemented. Exemplary computing environments 100 may include, but are not limited to, personal computers, mainframe computers, servers, hand-held or laptop devices, mobile telephones, multiprocessor systems, microprocessor-based systems, set top boxes, programmable consumer electronics, network PC's, minicomputers, distributed computing environments that include any of the above systems or devices, and the like. However, it should be understood that the features and aspects of exemplary embodiments of the present invention may be implemented by or into a variety of systems and system configurations and any examples provided within this description are for illustrative purposes only.

FIG. 5 and the following discussion provide a general overview of a platform onto which exemplary embodiments of the present invention, or portions thereof, may be integrated, implemented and/or executed. Although in the context of portions of an exemplary environment, the invention may be described as consisting of instructions within a software program being executed by a processing unit, those skilled in the art will understand that portions of an exemplary embodiment of the present invention, or the entire invention itself may also be implemented by using hardware components, state machines, or a combination of any of these techniques. In addition, a software program implementing an embodiment of the present invention may run as a stand-alone program or as a software module, routine, or function call, operating in conjunction with an operating system, another program, system call, interrupt routine, library routine, or the like. The term program module may be used to refer to software programs, routines, functions, macros, data, data structures, or any set of machine readable instructions or object code, or software instructions that may be compiled into such and executed by a processing unit 112.

Those skilled in the art will appreciate that the computing environment illustrated by FIG. 5 may take on many forms and may be directed towards performing a variety of functions. Generally, the computing environment illustrated in FIG. 5 may be any system that includes a computer processor.

Examples of such forms and functions include, but are not limited to, personal computers, hand-held devices such as personal data assistants, note-book computers, mobile telephones, lap-top computers, mainframe computers, servers and a variety of other applications, each of which may serve as an exemplary environment for embodiments of the present invention.

The exemplary computing device 110 may comprise various components including, but not limited to, a processing unit 112, non-volatile memory 114, volatile memory 116, and a system bus 118 that couples the non-volatile memory 114 and volatile memory 116 to the processing unit 112. The non-volatile memory 114 may include a variety of memory types including, but not limited to, read only memory (ROM), electronically erasable read only memory (EEROM), electronically erasable and programmable read only memory (EEPROM), electronically programmable read only memory (EPROM), electronically alterable read only memory (EAROM), FLASH memory, bubble memory, battery backed random access memory (RAM), CDROM, digital versatile disks (DVD) or other optical disk storage, magnetic cassettes, magnetic tape, magneto-optical storage devices, or any other medium which may be used to store the desired information.

The non-volatile memory 114 may provide storage for power-on and reset routines (bootstrap routines) that are invoked upon applying power or resetting the computer device 110. In some configurations the non-volatile memory 114 may provide the basic input/output system (BIOS) routines that may be utilized to perform the transfer of information between elements within the various components of the computing device 110.

The volatile memory 116 may include, but is not limited to, a variety of memory types and devices including, but not limited to, random access memory (RAM), dynamic random access memory (DRAM), bubble memory, registers, or the like. The volatile memory 116 may provide temporary storage for routines, modules, functions, macros, data etc. that are being or may be executed by, or are being accessed or modified by, the processing unit 112.

Alternatively, the non-volatile memory 114 and/or the volatile memory 116 may comprise a remote storage facility accessible through a wired and/or wireless network system. Additionally, the non-volatile memory 114 and/or the volatile memory 116 may comprise a memory system comprising a multi-stage system of primary and secondary memory devices, as described above. The primary memory device and secondary memory device may operate as a cache for the other or the second memory device may serve as a backup to the primary memory device. In yet another arrangement, the non-volatile memory 114 and/or the volatile memory 116 may comprise a memory device configured as a simple database file or as a searchable, relational database using a query language, such as SQL.

The computing device 110 may access one or more external display devices 130 such as a CRT monitor, LCD panel, LED panel, projector display, electro-luminescent panel, or other display device, for the purpose of providing information or computing results to a user. In some embodiments, the external display device 130 may actually be incorporated into the product itself. The processing unit 112 may interface to each display device 130 through a video interface 120 coupled to the processing unit 112 over the system bus 118.

The computing device 110 may send output information, in addition to the display 130, to one or more output devices 136 such as a network interface, speaker, modem, printer, plotter, facsimile machine, RF or infrared transmitter, computer or any other of a variety of devices that may be controlled by the computing device 110. The processing unit 112 may interface to each output device 136 though an output interface 126 coupled to the processing unit 112 over the system bus 118.

The computing device 110 may receive input or commands from one or more input devices 134 such as a keyboard, pointing device, touch device, mouse, modem, RF or infrared receiver, microphone, joystick, track ball, light pen, game pad, scanner, camera, computer or the like. The processing unit 112 may interface to each input device 134 through an input interface 124 coupled to the processing unit 112 over the system bus 118.

It will be appreciated that program modules implementing various embodiments of the present invention may be stored in the non-volatile memory 114, the volatile memory 116, or in a remote memory storage device accessible through the output interface 126 and the input interface 124 or the storage interface 122. The program modules may include an operating system, application programs, other program modules, and program data. The processing unit 112 may access various portions of the program modules in response to the various instructions contained therein, as well as under the direction of events occurring or being received over the input interface 124 or network interface 128.

The computing device 110 may provide data to and receive data from one or more other storage devices 132, which may provide volatile or non-volatile memory for storage and which may be accessed by computing device 110. The processing unit 112 may interface to each storage device 132 through a storage interface 122 over the system bus 118.

The interfaces 120, 122, 124, 126, and 128 may include one or more of a variety of interfaces, including but not limited to, parallel or serial bus interfaces such as PCI, PCIx, PCIe, IDE and SATA, cable modems, DSL, Ti, V series modems, Ethernet, optical interfaces, an RS-232 serial port interface or other serial port interface, a parallel port interface, a universal serial bus (USB), a general purpose interface bus (GPIB), an optical interface such as infrared or IrDA, an RF or wireless interface such as Blue-tooth, or other interface.

Figure 6:
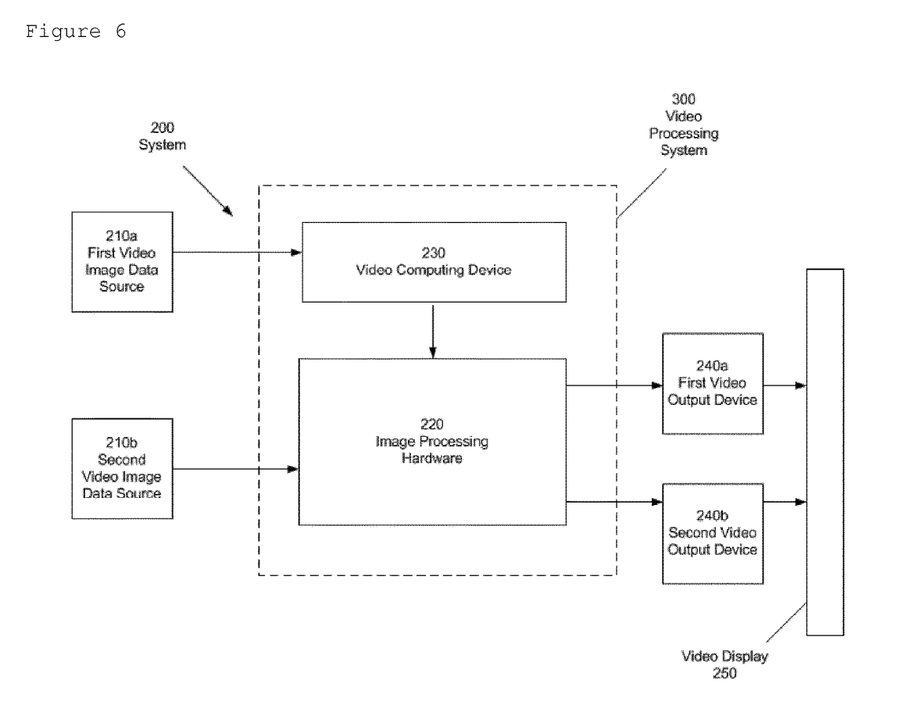
FIG. 6 is an illustration of the system according to an embodiment of the present invention.

FIG. 6 illustrates a block diagram of a system 200 according to an exemplary embodiment of the present invention. The system 200 preferably comprises a first video data source 210a and a second video data source 210b in connection with a video processing device 230 or image processing hardware 220. In other contemplated embodiments, the system may comprise additional video data sources. The video data sources 210a and 210b may be selected from a plurality of sources such as a computing device, digital video camera, camcorder, DVD player, VCR player, HD player, solid state drive player, television receiver, satellite receiver, gaming station, or other device capable of generating video data. The video image data from the video data sources 210a and 210b may be transmitted to the video processing device 230 or image processing hardware 220 over cables such as twisted pair, coaxial, fiber optical, RGB, DVI, Dual DVI, HDMI, FireWire, DisplayPort, component, or other suitable cables for transmitting video data. In other contemplated embodiments, the video data could be transmitted from the video image data sources 210a and 210b to the image processing hardware wirelessly by utilizing infrared, Bluetooth, IEEE 802.11 type standards, or other suitable protocols. In further contemplated embodiments of the present invention, the video input source may be a remote device, and the video data would be transmitted over the internet or over a local area network (wired or wireless LAN) and received by the by the video processing device 230 or image processing hardware 220 through a network cable such as an RJ45, or any other suitable network cable type including optical fiber-optic cables, or via a wireless network adapter. In contemplated embodiments, the video data transmitted over the network may be in an MPEG, MPEG2, Mpeg4, JPEG 2000, JPEG-LS, H.264, H.265, PCM, DPCM or other suitable format.

Separate video data sources 210a and 210b may be employed to increase video processing capacity. Each of the video image data sources 210a and 210b may generate a portion of a desired image. For example, the first video data source 210a may generate the left half of the image, and the second video data source 210b may generate the right half of the image. The two images would then be processed and considered as a single logical source by the compositor. Such an arrangement is preferable because the resolution of the desired image may be too large for a single device to reliably generate the entire image.

The images generated by the video data sources 210a and 210b may have overlapping areas. For example, the right image may comprise a vertical column at its left edge comprising the same video data that is present in a vertical column at the right edge of the left image. In such an arrangement, the two images cannot simply be placed side by side to form a single coherent image. Rather, the images may be overlaid such that the common video data is not displayed twice. In other contemplated embodiments, such an overlapping arrangement can be employed for more than two generated images, and may comprise overlapping video data at any of the four sides of each image.

The image processing hardware 220 preferably is connected to a processing device such as a central processing unit (CPU), microcontroller, microprocessor, application-specific integrated circuit (ASIC), a digital signal processor (DSP), system-on-a-chip (SoC), Field-programmable gate array (FPGA), programmable-logic device (PLC), programmable electrically erasable logic (PEEL), programmable array logic (PAL), generic array logic (GAL), or another suitable device. The image processing hardware 220 is preferably in communication with a video computing device 230 via suitable video data cables such as discussed above. In other contemplated embodiments, the image processing hardware 220 and video computing device 230 may be in wireless or wired communication using a suitable bus or network protocol as discussed above. In further contemplated embodiments, the image processing hardware 220 may be a card that can be plugged into an interface slot of the video computing device 230. The video computing device 230 can be substantially similar to computing device 110. In other contemplated embodiments of the present invention, the image processing hardware 220 may be housed within the same structure as the video computing device 230. In further contemplated embodiments, the image processing hardware 220 may be integrated with the video computing device 230 rather than being a standalone device.

The Image processing hardware 220 is preferably in communication with a first video output device 240a and a second video output device 240b via suitable video data cables such as discussed above. The video output devices 240a and 240b may be selected from devices such as video monitors, video projectors, plasma displays, LCDs, CRTs, or other suitable display devices. In an exemplary embodiment of the present invention, the system 200 may comprise video projectors as output devices 240a and 240b, and a display screen 250 onto which the projectors display an image. In other contemplated embodiments, a single display device may be used. In further contemplated embodiments, the resulting composed image or parts of it may be transmitted on one or multiple networks as one or multiple network streams. These network streams may use MPEG, MPEG2, Mpeg4, JPEG 2000, JPEG-LS, H.264, H.265, PCM, DPCM or other suitable format and may use encryption. In the latter embodiment first video output device 240*a* and second video output device 240*b* may be redundant. Other contemplated embodiments include video computing device 230 and/or image processing hardware 220 being implemented as virtual machines.

According to an aspect of the present invention, there is provided a computer program product comprising software for executing a method for obtaining a dynamic display layout on a display area having at least one sub-area defined thereon, when executed on a processing engine such as not but not exclusively what has been described with respect to FIGS. 5 and 6 but also any other processing engine adapted to carry out such a method. Video can be provided by a video data source which can be a device, storage, server, or similar that provides video image data. The video data source may additionally provide audio data, associated with the video image data. The software can include code segments which when executed on a processing engine provide a method step or a means for receiving video image data from a video data source. The software can include code segments which when executed on a processing engine provide a method step or a means for evaluating a rule associated with each respective one of said at least one sub-areas as applied to a property of said received video image data or said video data source. The software can include code segments which when executed on a processing engine provide a method step or a means such that if said evaluating results in acceptance of said video image data by one of said at least one sub-area, assigning said video image data to said one sub-area; otherwise, allocating an additional sub-area on said display area, and assigning said video image data to said additional sub-area. The software can include code segments which when executed on a processing engine provide a method step or a means for allocating each sub-area according to properties of the video image data assigned to it or of the video data source from which said respective video image data is received.

The software can include code segments which when executed on a processing engine provide a method step or a means for determining whether video image data from a given video data source can be hosted by said sub-area in accordance with any rule, or set of rules, associated with each sub-area (i.e., each bounding box for video image data originating from a certain video data source). The software can include code segments which when executed on a processing engine provide a method step or a means for allocating a new sub-area for this source if no available sub-area is adequate.

The software can include code segments which when executed on a processing engine provide a method step or a means for making the size of each respective sub-area proportional to the number of native pixels of the video image data assigned to it. It is an advantage of this embodiment that size ratios between video streams from different sources are respected.

The software can optionally include code segments which when executed on a processing engine provide a method step or a means for making the size of each respective sub-area proportional to the number of symbols of the video image data assigned to it. The software can include code segments which when executed on a processing engine provide a method step or a means for adapting the symbol size of the sub-areas such a way that the size of displayed symbols in respective allocated sub-areas will be equal or substantially equal.

It is an advantage of this embodiment that symbols can be shown in a similar way across different sub-areas of the display area, regardless of the video data source from which they originate.

The software can include code segments which when executed on a processing engine provide a method step or a means for dividing the display area into sub-areas along lines with arbitrary orientations. In a particular embodiment, the software can include code segments which when executed on a processing engine provide a method step or a means for dividing the display area into sub-areas along horizontal lines and/or vertical lines.

The software can include code segments which when executed on a processing engine provide a method step or a means for dividing a display area can efficiently in any number of arbitrary polygons, and in particular rectangles.

The software can include code segments which when executed on a processing engine provide a method step or a means for evaluating an energy function for a plurality of display layouts, and for selecting an optimal layout on the basis of said energy function.

The software can include code segments which when executed on a processing engine provide a method step or a means for comparing different layouts, i.e. sub-area allocations, in an objective way, and the selection of a good, e.g. an optimal layout can be performed automatically.

The software can include code segments which when executed on a processing engine provide a method step or a means for selecting a display layout that minimises the energy function.

The software can include code segments which when executed on a processing engine provide a method step or a means for basing the energy function on the amount of white space.

The software can include code segments which when executed on a processing engine provide a method step or a means for allocating video image data from a plurality of video data sources to a sub-area.

The software can include code segments which when executed on a processing engine provide a method step or a means for displaying video image data from a first one of said plurality of video data sources in full or partial overlay relative to video image data from a second one of said plurality of video data sources.

The software can include code segments which when executed on a processing engine provide a method step or a means for combining video streams arbitrarily within a given sub-area, which can lead to more optimal use of the total display area.

The software can include code segments which when executed on a processing engine provide a method step or a means for using a rule associated with a given sub-subarea which governs a position and/or a size of video image data within said given sub-area, relative to said given sub-area and/or relative to a position of other video image data allocated to said given sub-area.

The software can include code segments which when executed on a processing engine provide a method step or a means for using size and position based rules which efficiently lead to a good, e.g. optimal usage of the display area on the basis of geometrical criteria.

The software can include code segments which when executed on a processing engine provide a method step or a means for scaling the video image data in a way that preserves aspect ratio.

The software can include code segments which when executed on a processing engine provide a method step or a means for displaying images in a natural-looking way.

The software can include code segments which when executed on a processing engine provide a method step or a means for scaling video image data and for positioning in such a way that no overlap is created between video image data from different video data sources.

The software can include code segments which when executed on a processing engine provide a method step or a means for using the full capacity of the display area to simultaneously show as many different video feeds as possible.

The software can include code segments which when executed on a processing engine provide a method step or a means for using video image data from each video data source comprising one or more of a text, an image, a sequence of images, and a video stream.

The software can include code segments which when executed on a processing engine provide a method step or a means for using in a selected layout, the position and/or size of video image data from a given video data source to provide directional characteristics of an audio signal corresponding to said given video data source.

The software can include code segments which when executed on a processing engine provide a method step or a means for reproducing the audio associated with simultaneously displayed video feeds in such a way that it is psychoacoustically perceived in a way that is consistent with the spatial distribution of the displayed images.

The present invention also provides a controller for use in a video processing system for generating a dynamic display layout, and especially for use with a display having a display area. The controller can be a stand-alone devices implemented for example as a microcontroller and adapted for use with the display. The controller can comprise at least one input interface arranged to receive video image data from a respective video data source, a frame buffer memory, an output interface arranged to send a video stream from said frame buffer memory to the display having a display area, a rule memory for storing rules associated with respective sub-areas defined on said display area, and rule evaluation logic configured to evaluate said rules as applied to a property of said received video image data or said video data source;

wherein the controller is adapted to add received video image data from one video data source to the frame buffer memory;

wherein the controller is configured to position the received video image data according to a result of an evaluation by said rule evaluation logic, in such a way that:

if the respective rule associated with one of the at least one sub-area accepts the received video image data, the received video image data is assigned to said one sub-area;

otherwise, an additional sub-area is allocated on the display area, and the received video image data is assigned to said additional sub-area;

and wherein the controller is configured to allocate each sub-area according to properties of the respective video image data assigned to it or of the video data source from which said respective video image data is received.

While the invention has been described hereinabove with reference to specific embodiments, this is only done to illustrate and not to limit the invention, the scope of which shall be determined in accordance with the accompanying claims. The skilled reader shall appreciate that elements and features described only in connection with method embodiments, may be used in apparatus embodiments with the same technical effects and advantages, and vice versa.

The invention claimed is:

1. A method for obtaining a dynamic display layout on a display area having at least one sub-area defined thereon, the method comprising:

receiving video image data from a video data source;

evaluating a rule associated with each respective one of said at least one sub-area as applied to a property of said received video image data or said video data source;

if the property of said video image data from said video data source complies with the rule associated by at least one sub-area for entering said sub-area, assigning said video image data to said one sub-area;

otherwise, allocating an additional sub-area on said display area, by dividing said display area into sub-areas along horizontal lines and/or vertical lines, for each possible division of said display area, and assigning said video image data to said additional sub-area; wherein each sub-area is allocated according to properties of the video image data assigned to it or of the video data source from which said respective video image data is received, thereby forming a plurality of arrangements of sub-areas, wherein each arrangement of sub-areas results in a display layout, evaluating with an energy function a specific condition of each display layout for the plurality of display layouts, and selecting an optimal display layout which minimizes said energy function.

2. The method according to claim 1, wherein the size of each respective sub-area is proportional to the number of initial pixels of the video image data assigned to it.

3. The method according to claim 1, wherein the size of each respective sub-area is proportional to the number of symbols of the video image data assigned to it.

4. The method according to claim 3, wherein the symbol size of the sub-areas is adapted in such a way that the size of displayed symbols in respective allocated sub-areas will be substantially equal.

5. The method according to claim 1, wherein the energy function evaluates the amount of white space in each display layout.

6. The method according to claim 1, wherein video image data from a plurality of video data sources are allocated to a sub-area, according to a rule of said sub-area.

7. The method according to claim 6, wherein video image data from a first one of said plurality of video data sources is displayed in full or partial overlay relative to video image data from a second one of said plurality of video data sources.

8. The method according to claim 1, wherein the rule associated with a given sub-subarea regulates a position and/or a size of video image data within said given sub-area, relative to said given sub-area and/or relative to a position of other video image data allocated to said given sub-area.

9. The method according to claim 1, wherein the video image data is scaled in a way that preserves aspect ratio.

10. The method according to claim 1, wherein video image data is scaled and positioned in such a way that no overlap is created between video image data from different video data sources.

11. The method according to claim 1, wherein video image data from each video data source comprises one or more of a text, an image, a sequence of images, and a video stream.

12. A method according to claim 1, wherein the position and/or size of a video image data from a given video data source in a selected layout is used to provide an audio signal which corresponds to the psycho-acoustically perceived audio signal consistent with the spatial distribution of the position and/or size of the video image data.

13. A video processing system for generating a dynamic display layout, comprising at least one input interface arranged to receive video image data from a respective video data source, a frame buffer memory, an output interface arranged to send a video stream from said frame buffer memory to a display having a display area, a rule memory for storing rules associated with respective sub-areas defined on said display area, and rule evaluation logic configured to evaluate said rules as applied to a property of said received video image data or said video data source;
   wherein the video processing system is adapted to add received video image data from one video data source to the frame buffer memory;
   wherein the video processing system is configured to position the received video image data according to a result of an evaluation by said rule evaluation logic, in such a way that:
      if the property of the received video image data complies with the rule associated with one of the at least one sub-area for entering said sub-area, the received video image data is assigned to said one sub-area;
      otherwise, an additional sub-area is allocated on the display area, by dividing said display area into sub-areas along horizontal lines and/or vertical lines, for each possible division of said display area, and the received video image data is assigned to said additional sub-area;
   wherein the video processing system is configured to allocate each sub-area according to properties of the respective video image data assigned to it or of the video data source from which said respective video image data is received, thereby forming a plurality of arrangements of sub-areas, wherein each arrangement of sub-areas results in a display layout,
   evaluating with an energy function a specific condition of each display layout for the plurality of display layouts, and
   selecting an optimal display layout which minimizes said energy function.

14. A controller for use in a video processing system for generating a dynamic display layout, and especially for use with a display having a display area, the controller comprising at least one input interface arranged to receive video image data from a respective video data source, a frame buffer memory, an output interface arranged to send a video stream from said frame buffer memory to the display having a display area, a rule memory for storing rules associated with respective sub-areas defined on said display area, and rule evaluation logic configured to evaluate said rules as applied to a property of said received video image data or said video data source;
   wherein the controller is adapted to add received video image data from one video data source to the frame buffer memory;
   wherein the controller is configured to position the received video image data according to a result of an evaluation by said rule evaluation logic, in such a way that:
      if the property of the received video image data complies with the rule associated with one of the at least one sub-area for entering said sub-area, the received video image data is assigned to said one sub-area;
      otherwise, an additional sub-area is allocated on the display area, by dividing said display area into sub-areas along horizontal lines and/or vertical lines, for each possible division of said display area, and the received video image data is assigned to said additional sub-area;
   and wherein the controller is configured to allocate each sub-area according to properties of the respective video image data assigned to it or of the video data source from which said respective video image data is received, thereby forming a plurality of arrangements of sub-areas, wherein each arrangement of sub-areas results in a display layout,
   evaluating with an energy function a specific condition of each display layout for the plurality of display layouts, and
   selecting an optimal display layout which minimizes said energy function.

* * * * *